3,200,038
TOPICAL ANTI-RHEUMATIC COMPOSITIONS COMPRISING TETRAHYDROFURFURYL 3-PYRIDYLACETATE
Vitangelo D'Amato, Milan, Italy, assignor to Lepetit S.p.A., Milan, Italy, an Italian body corporate
No Drawing. Filed Nov. 13, 1962, Ser. No. 237,371
Claims priority, application Great Britain, Nov. 23, 1961, 41,940/61
4 Claims. (Cl. 167—65)

The present invention relates to a new pharmacologically active compound and the process for the preparation of the same. More particularly, the compound with which the invention is concerned, is tetrahydrofurfuryl 3-pyridylacetate of the general formula:

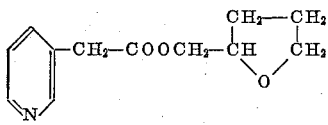

This compound is prepared by esterification of 3-pyridylacetic acid or any of its functional derivatives with tetrahydrofurfuryl alcohol or any equivalent functional derivative of the same. By a preferred embodiment of the invention, the compound is prepared by treating 3-pyridylacetic acid with tetrahydrofurfuryl alcohol in the presence of sulphuric acid.

The compound is active as a topical hyperemic and antirheumatic agent for topical use. It may be used in the form of an ointment by incorporating it in those ingredients which are best fit to that purpose, such as Vaseline and lanolin, with the addition of preservatives and antifermentative agents. Alternatively, the compound may be dissolved in a non toxic, non irritant solvent, such as a lower aliphatic alcohol or glycol.

A particular advantage of the new compound over other hyperemic agents of similar structure is that it does not show some undesirable side effects which are commonly displayed by said agents. These latter, when applied to patients with congenital heart diseases, cause a topical hyperemic condition which is accompanied by formation of severe edema. The same occurs when the patients are affected by rheumatic diseases which are not in the active phase; or even when therapy is conducted simultaneously with cortisone or aminopyrine. By other words, the use of the known analogous drugs is limited to cases of active rheumatism, when no heart diseases are present, and excludes the simultaneous use of other antirheumatic drugs.

The new compound of the invention, on the contrary, does not show these untoward effects. In experiments on humans, when topically applied in the form of 5% solution in 50% isopropanol, it caused a hyperemic condition lasting at least 4 hours and strictly limited to the treated cutaneous area (forearm), without any sign of edema. This action is accompanied by a relevant temperature rise, varying from 2° to 3° C. A blank conducted with a similar isopropanol solution containing a placebo showed a temperature rise not overcoming a maximum of about 1° C.

*Example 1.—Tetrahydrofurfuryl 3-pyridylacetate*

To a mixture of 46 g. of pyridylacetic acid and 204 g. of tetrahydrofurfuryl alcohol, 65 g. of conc. $H_2SO_4$ are added dropwise with cooling at 0° C. Then the mixture is heated on a waterbath for 7 hours and the excess alcohol is distilled off in vacuo. The residue is poured into 300 g. of ice water and made alkaline to pH 8 by the addition of $Na_2CO_3$.

After addition of sodium chloride the mixture is extracted with ethyl ether and the ether extract is evaporated to dryness giving 62 g. of crude product. This is distilled in a Claisen apparatus giving 55 g. of tetrahydrofurfuryl 3-pyridylacetate; B.P. 160–162° C.

*Example 2.—Skin ointment containing tetrahydrofurfuryl 3-pyridylacetate*

Composition for 100 g.

| | G. |
|---|---|
| Tetrahydrofurfuryl 3-pyridylacetate | 5 |
| Vaseline | 75 |
| Lanolin | 17 |
| Butylhydroxyanisol | 0.005 |
| Butylhydroxytoluene | 0.005 |
| Methyl p-hydroxybenzoate | 2.4 |
| Propyl p-hydroxybenzoate | 0.6 |

One kilogram of the above ointment may be prepared as follows.

In an Inox container, 750 g. of valine and 200 g. of anhydrous lanolin in which 0.05 g. of butylhydroxy-anisol and 0.05 g. of butylhydroxytoluene are incorporated, are melted on a sand bath at 60–65° C. The melted mass is filtered hot through several layers of fine gauze and cooled under stirring. To 950 g. of this mass transferred in a kneading machine, 50 g. of previously micronised tetrahydrofurfuryl 3-pyridylacetate are added in small portions, followed by 24 g. of methyl p-hydroxybenzoate and 6 g. of propyl p-hydroxybenzoate. Then the mass is kneaded to obtain a homogenous dispersion of the powder. After having passed the mass through a cylinder refiner it is filled into tubes.

*Example 3.—Alcoholic teinture containing tetrahydrofurfuryl 3-pyridylacetate*

Amounts of one, three and five grams respectively of tetrahydrofurfuryl-3-pyridylacetate are dissolved each in 100 ml. of isopropanol, giving solutions ready for topical application and containing 1, 3 and 5% respectively of active substance.

I claim:
1. A composition for combating rheumatism, which comprises as the active ingredient from about 1 to about 5 percent of tetrahydrofurfuryl 3-pyridylacetate together with a non-toxic diluent.
2. A composition for combating rheumatism in the form of an ointment containing from about 1 to about 5 percent of tetrahydrofurfuryl 3-pyridylacetate in an ointment base.
3. A composition for combating rheumatism in the form of an alcoholic teinture for topical use, consisting in a solution of about 1 to about 5 percent of tetrahydrofurfuryl 3-pyridylacetate in a non toxic lower aliphatic alcohol.
4. A composition as in claim 3, in which the lower aliphatic alcohol is isopropanol.

References Cited by the Examiner
UNITED STATES PATENTS

| 2,471,394 | 5/49 | Gubner | 167—65 |
| 2,475,569 | 7/49 | Mowat | 260—295 |
| 2,498,497 | 2/50 | Kirchner et al. | 260—295 |
| 3,047,462 | 7/62 | Maillard et al. | 167—65 |

JULIAN S. LEVITT, *Primary Examiner.*